(12) United States Patent
Taitler

(10) Patent No.: US 6,272,396 B1
(45) Date of Patent: Aug. 7, 2001

(54) METHOD FOR APPLYING KNOWLEDGE FROM A SKILLED WORKER VIA A MASTER EXPERT MACHINE TO A SLAVE EXPERT MACHINE FOR REPETITIVE TASKS

(75) Inventor: Isaac Taitler, Haifa (IL)

(73) Assignee: Tairob Industrial Technology Ltd., Haifa (IL)

( * ) Notice: Subject to any disclaimer, the term of this patent is extended or adjusted under 35 U.S.C. 154(b) by 0 days.

(21) Appl. No.: 09/025,430

(22) Filed: Feb. 20, 1998

(51) Int. Cl.[7] ........................................ G06F 19/00
(52) U.S. Cl. .................... 700/245; 700/248; 318/568.13; 901/3
(58) Field of Search .......................... 700/86, 88, 248, 700/245, 246, 257, 264, 260, 253, 64, 65; 318/568.13, 568.14, 568.17; 706/20, 45; 901/3, 43

(56) References Cited

U.S. PATENT DOCUMENTS

| | | | |
|---|---|---|---|
| 4,553,077 | * 11/1985 | Brantmark et al. | 318/568.13 |
| 4,570,385 | * 2/1986 | Richter et al. | 451/5 |
| 4,608,651 | * 8/1986 | Murakami et al. | 700/25 |
| 4,764,883 | * 8/1988 | Nakagawa et al. | 700/252 |
| 4,897,586 | * 1/1990 | Nakata et al. | 700/260 |
| 5,006,999 | * 4/1991 | Kuno et al. | 700/253 |
| 5,579,444 | * 11/1996 | Dalziel et al. | 700/259 |
| 5,646,493 | * 7/1997 | Hara et al. | 318/568.17 |
| 5,748,854 | * 5/1998 | Watanabe et al. | 700/258 |
| 5,845,050 | * 12/1998 | Sekiguchi | 706/20 |

OTHER PUBLICATIONS

BergamaSeo M., Teleoperation with large time–delay using a prevision system, PERCRU, pp. 125–130, 1997.*

* cited by examiner

Primary Examiner—William Grant
Assistant Examiner—Kidest Bahta
(74) Attorney, Agent, or Firm—Mark M. Friedman

(57) ABSTRACT

A mobile expert machine that moves along a nominal predefined trajectory. The expert machine should be a substitute for unskilled labor performed at workstations characterized by repetitive activities. An expert machine is defined as a machine that performs a specific task; the knowledge applied to the machine should be used to perform a repetitive task professionally. Predefined trajectory is defined as the actual trajectory that the slave expert machine should follow. The slave expert machine should move along a known predefined trajectory whose parameters have been calculated prior to start-up of the motion. It is assumed that the trajectory is given as function of time and the disturbances are well known. A Master Expert Machine (MEM) is incorporated with sensors for sensing and reading joint motions. It features excellent follow-up attributes and records motion activity in its memory by a process of "machine learning" within the study area. A skilled worker transfers his professional knowledge to the master expert machine in the form of elementary motions and subdivided tasks. The required task would be implemented via superposition and concatenation of the elementary moves and subdivided tasks. Based on the assumption that every task can be partitioned into a defined set of "elementary trajectories", the master expert machine could be "loaded" by a skilled worker with the required data to implement any elementary trajectory. Using this strategy will enable implementation of long and compound tasks by identification of the "elementary trajectories" within a particular task. The Master Expert Machine transfers its recorded "knowledge" to a set of Slave Expert Machines (SEMs) in the study area or, in particular cases, remotely to SEMs located in the working area. The slave expert machine, after it has learned from the MEM, then works in the same manner performing the task independently.

8 Claims, 7 Drawing Sheets

Inexperienced Operator Programs Slave Expert Machine with 3D parameters (option 1)

(Start) SEM in the center of the room
SEM owns sensor for distance measurement

↓

| Measure distance to right corner up |

↓

| Measure distance to right corner down |

↓

| Measure distance to left corner up |

↓

| Measure distance to left corner down |

↓

| Operator enters rounded/straight wall or Operator turns on TV camera for wall recognition |

↓

| Activate sensor for measurement of walls, corners and openings |

↓

( Proceed )

Fig.8

METHOD FOR APPLYING KNOWLEDGE FROM A SKILLED WORKER VIA A MASTER EXPERT MACHINE TO A SLAVE EXPERT MACHINE FOR REPETITIVE TASKS

FIELD AND BACKGROUND OF THE INVENTION

The present invention relates to robotics and, more particularly, to a method of applying knowledge from a human operator to a mobile slave expert machine via a master expert machine.

Robots are used for performing tasks in the factory at the production lines or a special purpose tasks in the laboratory or the like for full automation of the process. A traditional robotic system consists of:

a. The robot (for example a 6 degrees of freedom)
b. The end effector (gripper) and tooling equipment
c. Installation and the operator/programmer.

Installing a robotic system includes the developing of an end effector for the specific task and accessories needed for the automatic activity of the robot, in addition to the task programming of the robot. The robot's operator should be trained for several months, mostly at the robot's manufacturer place. Those facts cause a manual manufacturing of robots and massive integration & installation activity, leading to a very high cost of the robotic system, and explaining the missing mass production of robotic systems. For the same reasons, performing a professional task (only a skilled worker does) via the present equipment (traditional robotic systems) is a very complicated mission due to the complexity of the integration/controlling of the robot in such activity having clear economic consequences.

There exist known expensive robots of multi-tasking ability, with remarkable flexible reprogramming possibilities, for different tasks. Most types share common problems: high costs, operator training, specific coding (custom software), complicated final debug process at factory and high maintenance cost.

SUMMARY OF THE INVENTION

A robotic control method for implementing low cost robots for repetitive tasks is disclosed below.

The object of the new robotic method is a Low Cost Expert Machine, single tasked with limited flexibility in changing tasks, for operating in repetitive activity. Assuming that a robot can perform one task per one time unit at a given working area, then the relative advantage of the expensive robot is minimized or canceled during that period, relative to the low cost machine.

The expert machine is an autonomous system, working outside the production room and intended to replace the traditional formula which claims that approximately 55% of an overall robotic system's costs is for the robot, 30% is for additional tooling and about 15% is for installation. The main goal of this invention is to implement a low cost expert machine for a single task activity, and totally eliminate the additional tooling and installation elements, required in the traditional robotic system.

A professional single tasked activity, according to this invention, is implemented via a Master—Slave Robotic system and method. This system comprises substantially:

1. A Master Expert Machine (MEM) for learning, and recording a professional task from a skilled worker and for calculating and processing appropriate parameters for a Slave Expert Machine.

2. A Slave Expert Machine (SEM) for performing the single task whose parameters were obtained from the MEM. The SEM has a similar number of links as the MEM but less sensors & transmission means, less electronics and requires significantly less computing algorithms than the Master Expert Machine. Any number of SEMs can be located in the working areas without any physical or communication touch with the MEM. The Master—Slave concept opens a new robotic area for autonomous Expert Machines for a professional single tasked activity.

According to the present invention there is provided a method of applying knowledge from a human operator to a mobile slave expert machine via a master expert machine, the knowledge serving for computing an optimal control law being required for performing professionally preferably repetitive tasks consisting of a sequence of elementary moves to be performed by the slave expert machine instead of a human operator, the method including the following main sequence of steps: (a) teaching of the master expert machine to perform the required professional task so as to create within the master expert machine a sharable data base for computing a control law for the task, (b) computing the control law for performing the task and dividing the task into subtasks, associated with elementary move, (c) adapting of the sharable data base to the computed control law and to the slave expert machine, (d) transferring the adapted sharable data base and the control law from the master expert machine to the slave expert machine, whereby the slave expert machine can perform the task autonomously and independent of any form of connection to the master expert machine subsequent to the transfer, and, (e) providing the slave expert machine with a programmed data associated with a particular task to be performed.

According to further features in preferred embodiments of the invention described below, the teaching is performed by tracking activity of the master expert machine, the tracking activity is carried out by the human operator so as to move the master expert machine spatially along a predefined trajectory corresponding to the task and the tracking activity is accompanied by generating of plurality of signals in response to movements of the master expert machine, the signals are converted into digital form and stored in the sharable data base.

According to still further features in the described preferred embodiments, the plurality of signals defining movement of the master expert machine refers to at least one parameter chosen from the group comprising displacement, force, speed and acceleration.

According to still further features in the described preferred embodiments, tracking of the master expert machine is carried out along elementary trajectories corresponding to division of the task into the sequence of elementary moves.

According to still further features in the described preferred embodiments, the plurality of signals defining movement of the master expert machine refers to all four of the parameters: displacement, force, speed and acceleration.

According to still further features in the described preferred embodiments, the sharable adapted data base and said computed control law are transferred from the master expert machine to the slave expert machine via a communication link chosen from the group comprising a remote control line or a wire communication link.

According to still further features in the described preferred embodiments, the programmed data comprises spatial 3D representation of the task to be performed.

According to still further features in the described preferred embodiments, the slave expert machine performs a task via superposition and concatenation of a plurality of subtasks and elementary moves transmitted by the master expert machine.

Advantages of a slave expert machine in accordance with the present invention are:

1. Low cost—(50–80)% less than existing robots performing a similar task. The SEM's cost depends on various parameters as complexity of the repetitive task that it performs or on quantity and characteristics of its attached performance sensors which have a high valued contribution to the control complexity of the SEM. The cost varies between a minimum and maximum price: the minimum price includes limit switches and alarm sensory. The maximum price includes complete performance sensory in addition to limit switches and alarm sensory. A complete performance sensing is implemented via vision means (like TV camera), optical encoders, etc. A partial performance sensing may be implemented, for example, via a potentiometer instead of an optical encoder, sensed, for example, once per elementary move.
2. The expert's machine "learning" process eliminates the overhead usually required for specific coding (custom software) for a given trajectory. There is no need for additional software in order to perform the SEM's task.
3. There is no need of time for acclimating personnel to use the new machine, meaning the slave expert machine is an easy to operate apparatus by an inexperienced user.
4. Debugging operation will take a significantly shorter time. No need for additional sensory or adjust process during or after installation. The control design will reduce the time necessary to test or change the "predefined trajectory" from days to hours.
5. Will involve environmental and organizational positive consequences.

BRIEF DESCRIPTION OF THE DRAWINGS

In the drawings:

FIG. 8 shows a flow chart, where an inexperienced operator programs a Slave Expert Machine with 3D parameters according to one option, and, FIG. 9 is a flow chart, where an inexperienced operator programs a Slave Expert Machine with 3D parameters according to a second option.

DESCRIPTION OF THE PREFERRED EMBODIMENTS

Figure 1:
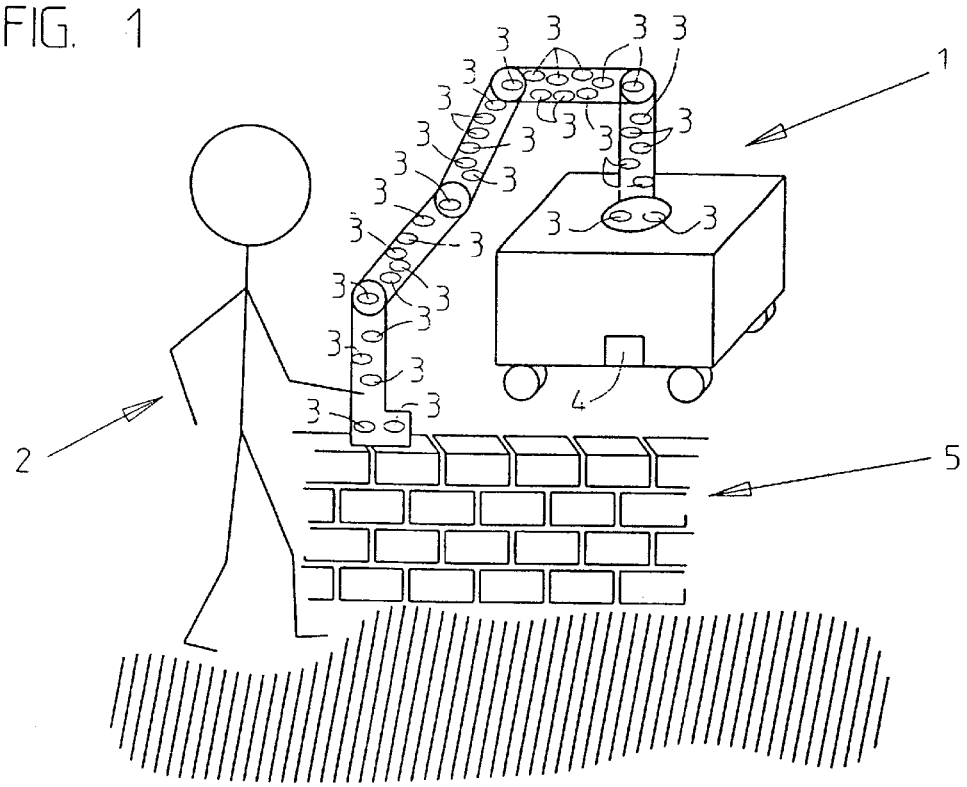
FIG. 1 shows a master expert machine (MEM) incorporated with various sensors for learning from a skilled worker by a process of "machine learning" in a study area.

FIG. 1 shows MEM 1 incorporated with various sensors 3 for reading joint motions, learning tasks and elementary moves from a skilled worker 2 by a process of "machine learning" in a study area 5. The skilled worker transfers his professional knowledge to the MEM in the form of elementary motions and subdivided task.

The procedures used by the expert machines to manipulate models and their attributes are created in, by individual functions executed by a computer means 4. The procedures used by the expert machines must be coherent with the adapted principles of work transferred by a professional skilled worker to the MEM.

Figure 2:
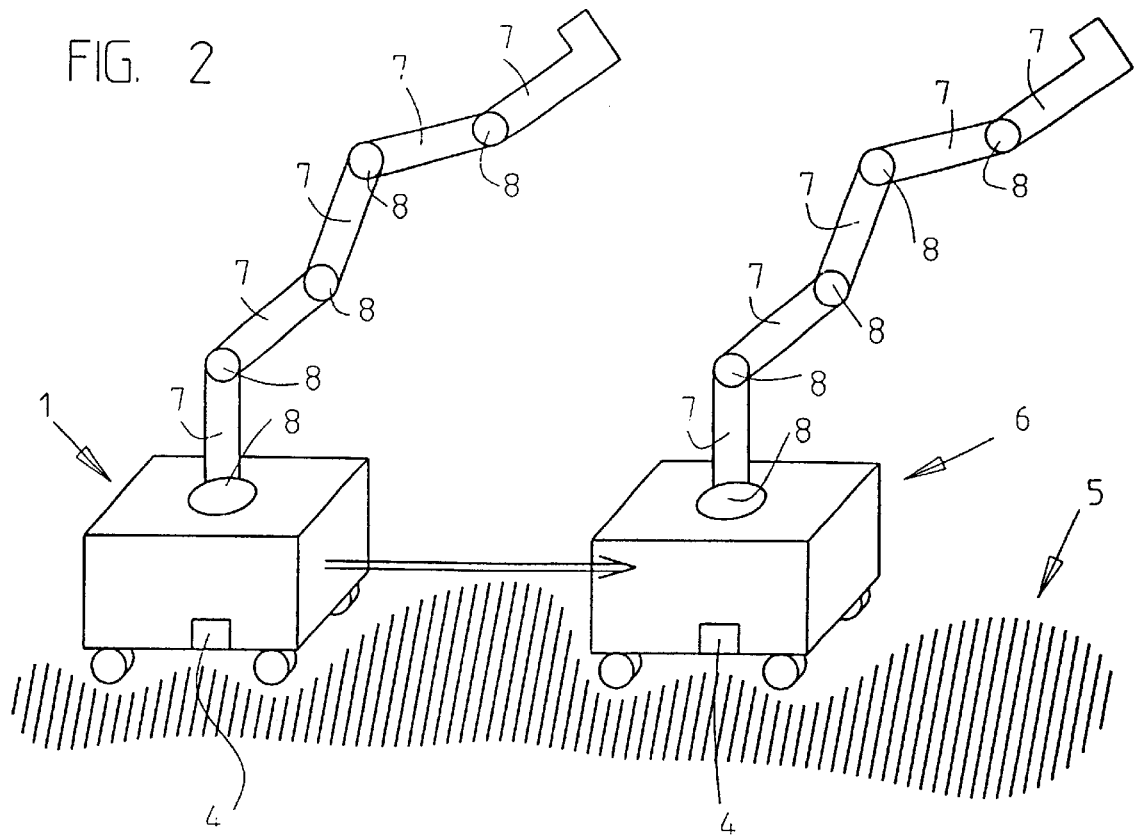
FIG. 2 shows the MEM transferring calculated position, force, speed and acceleration information to the slave expert machine (SEM) via communication means.

Position, force, speed and acceleration information of the master expert machine (MEM) 1 and corresponding to a calculated position, force, speed and acceleration of the slave expert machine (SEM) 6 is transferred to the SEM via communication means, as shown in FIG. 2. The associated operation between the MEM and SEM is obtained through the position, force, speed and acceleration relationship between the skilled worker and the MEM and by use of the learning procedure.

The master expert machine includes a plurality of master links 7 sequentially connected by joints 8. The MEM is incorporated with sensors 3 for sensing position, force, speed and acceleration and converters for converting corresponding signals into position, force, speed and acceleration signals of the SEM and means for supplying said signals to the SEM.

The slave expert machine includes a similar number of links as the master expert machine, sequentially connected by the same similar joints as the master expert machine. Through an optimization control program, the expert machine will calculate the optimal trajectories.

Figure 3:
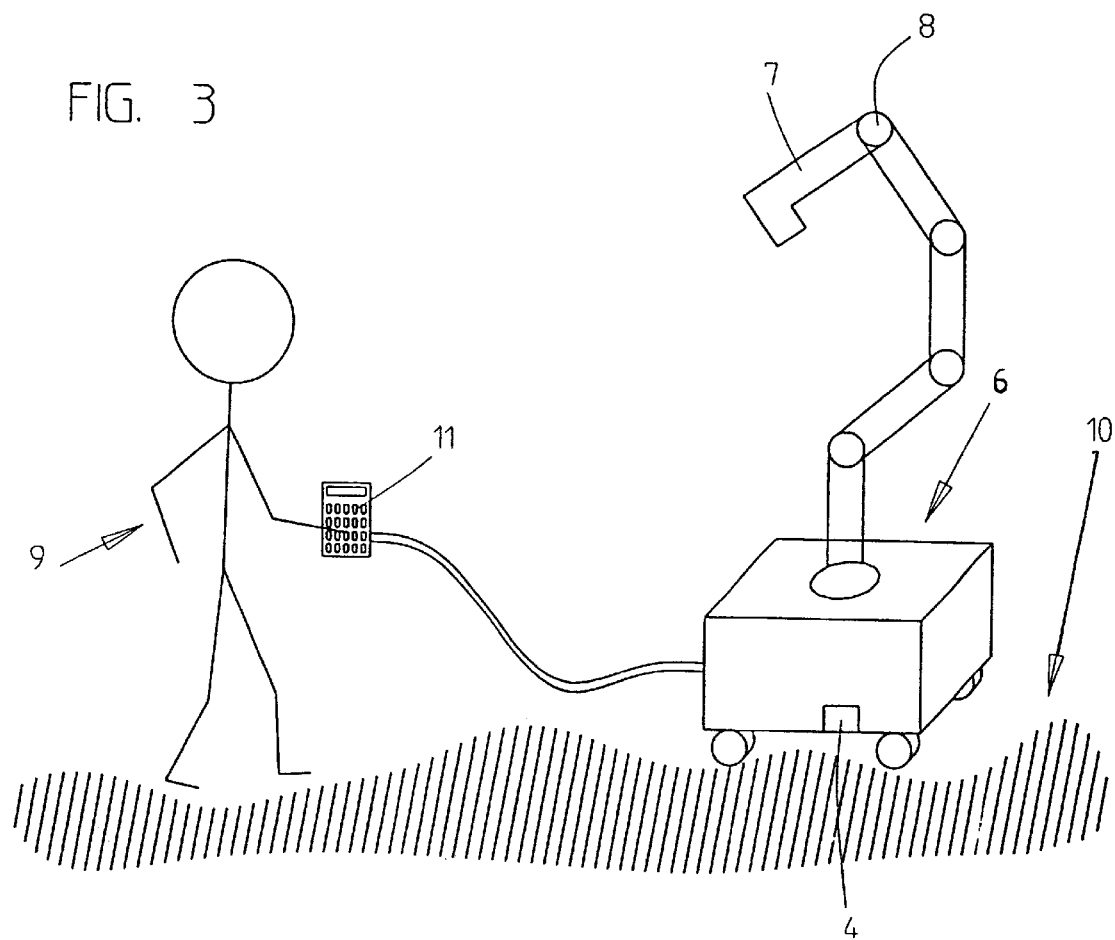
FIG. 3 shows an operator programming the SEM via an interface in the working area.

FIG. 3 shows an inexperienced operator 9 programming the SEM with 3D parameters of data task via an elementary, simply interface 11 in the working area 10 or remotely through a non-wire means.

Figure 4:
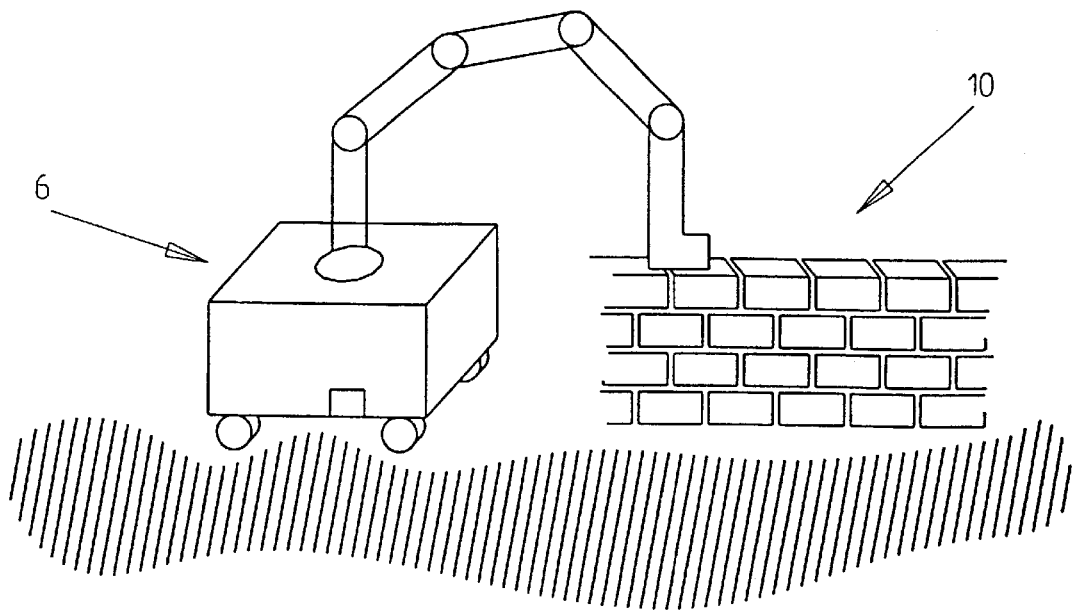
FIG. 4 shows a slave expert machine performing a task independently.

The slave expert machine performs the task independently, as shown in FIG. 4. Performing a similar task in a different diversified working area requires reprogramming of the SEM with suitable 3D parameters of data task.

Figure 5:
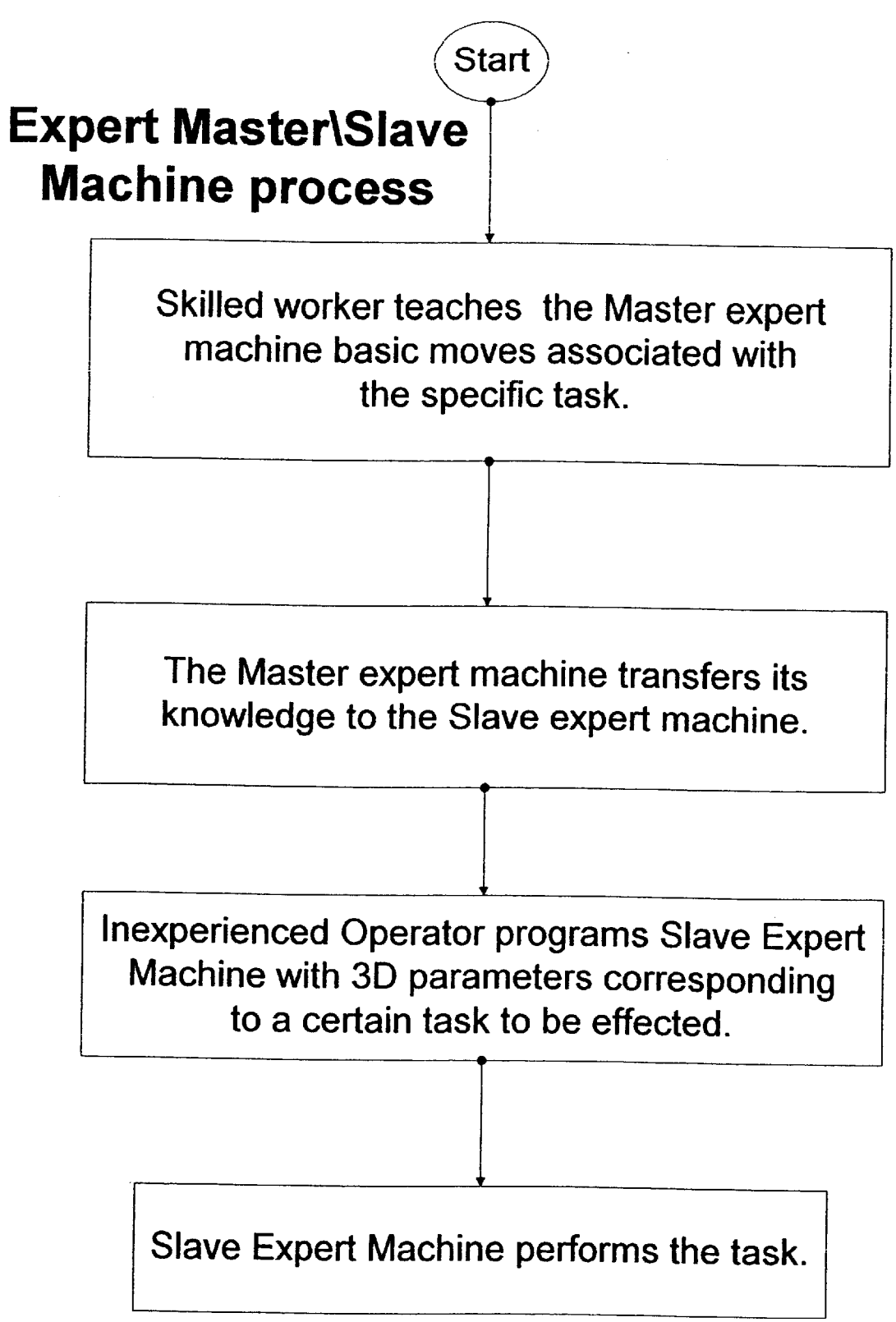
FIG. 5 is a general flow chart diagram corresponding to interaction between the MEM and SEM according to the Master—Slave method of this invention.

FIG. 5 shows a general flow chart diagram corresponding to interaction between the MEM and SEM.

Figure 6:
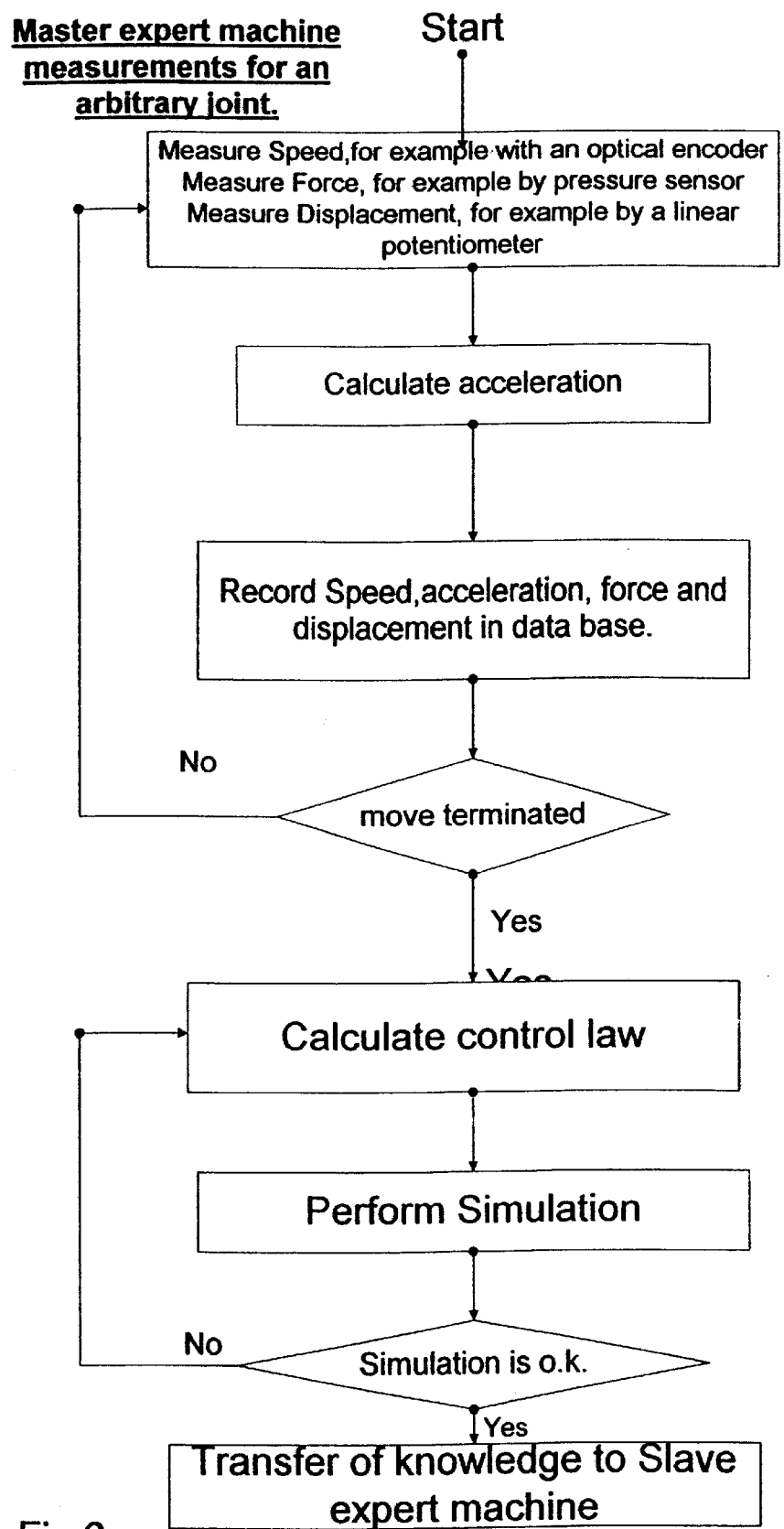
FIG. 6 is a flow chart corresponding to a certain task. The chart presents measurements and calculations made by the MEM prior to transferring of the knowledge to the SEM.

FIG. 6 shows a flow chart corresponding to a certain task. The chart presents measurements and calculations made by the MEM prior to transferring of the knowledge to the SEM. There exists know expensive robots with multi-tasking ability, having flexible opportunities to be reprogrammed for different tasks.

The object of the present invention is a low cost expert machine, single tasked with limited flexibility of changing tasks, for operating in repetitive activity. Assuming that a robot can perform one task per one time unit at a given working area then the relative advantage of the expensive robot is minimized or cancelled during that period, relative to the low cost machine.

Expert machines and Control process: Interactive data passing from a skilled worker to the master expert machine is implemented via sensors and control means to the sharable database. The relationship between man and MEM in the interactive man/machine activity is accepted through data passing. Uncertainty is produced by man and complexity is handled by machine.

The basic goal of the master's automatic controller is to optimize a given dynamical system so that it has a specified behaviour. A computing means makes a specialized body of knowledge accessible and therefore shareable. The master expert machine which owns an optimal controller in addition to other classical control properties is not supposed, for example, to be open loop stable, but it has to be the best possible system for implementing the predefined task. Feedback control is used in order to limit uncertainties.

A Representative Application Of An Expert Machine

Figure 7:
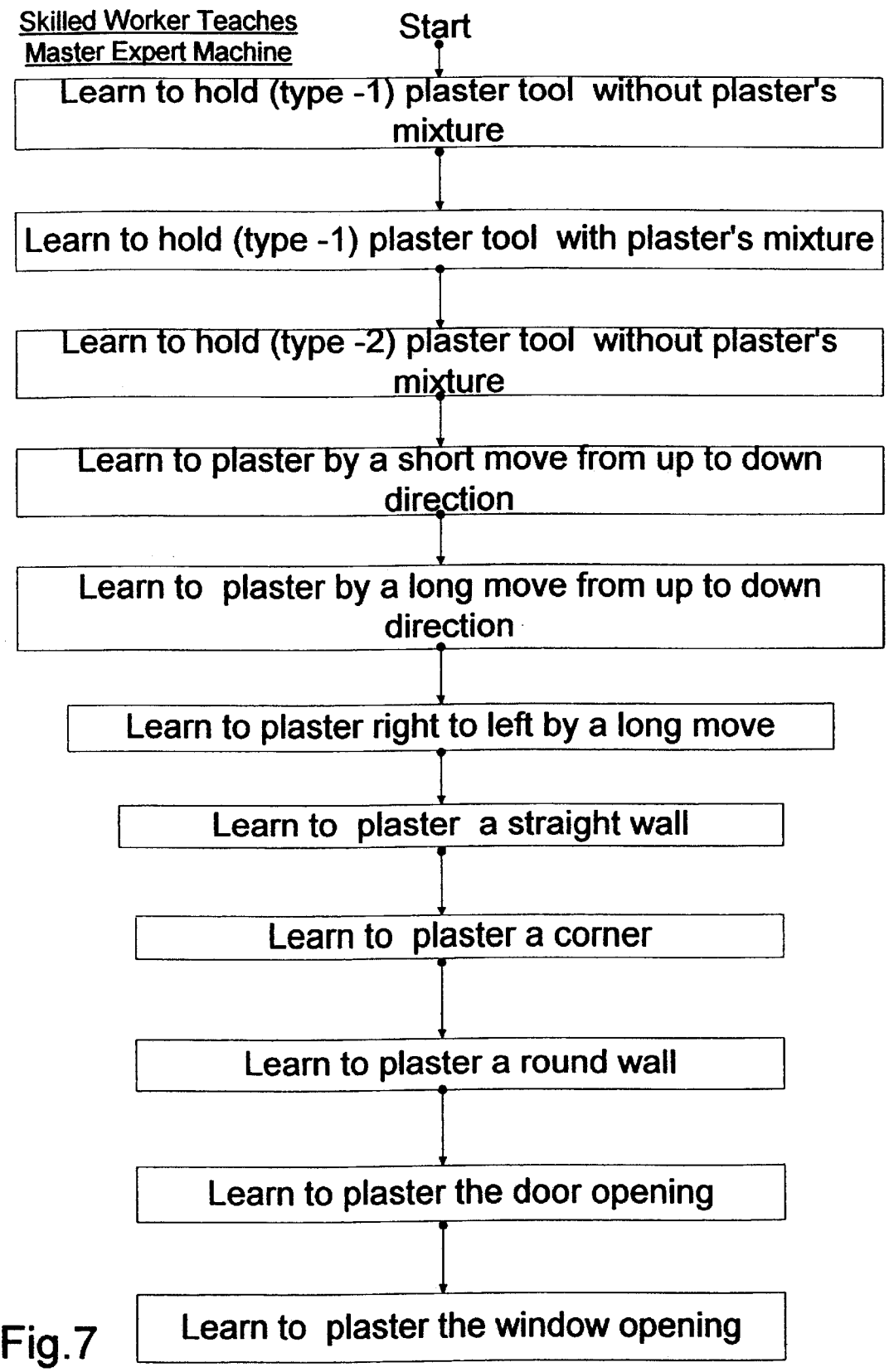
FIG. 7 is a flow chart, where a skilled worker teaches the Master Expert Machine.

For a meaningful discussion the following non-limiting example will clarify the potential of a master/slave expert machines in accordance with the present invention:
Construction center walls plasterer expert machine A master plasterer expert machine is incorporated in a laboratory with suitable electro-optics sensors and is ready to record the following activities as shown in FIG. 7.

1. A skilled plasterer worker adapts elementary moves and subtasks to the master expert machine by moving its arm accordingly.

An elementary move is loading plaster mixture on the molding tool and a subtask (for example) is plastering in an open space area, depending on the machine's arm length. A second subtask is plastering a corner. A third subtask is plastering a window or door opening.

Any of the above three subtasks may be divided into a subset of elementary moves such as plastering with a molding tool held at different angles according the working surface, as given in detail hereinbelow. The skilled worker moves together with the master expert machine from one area to the adjacent one, so teaching the machine various paths.

2. The expert machine transfers its recorded features to a number of slave expert machines.

3. The customer obtains a slave expert machine with a modest user interface ready to go . . .

Figure 9:
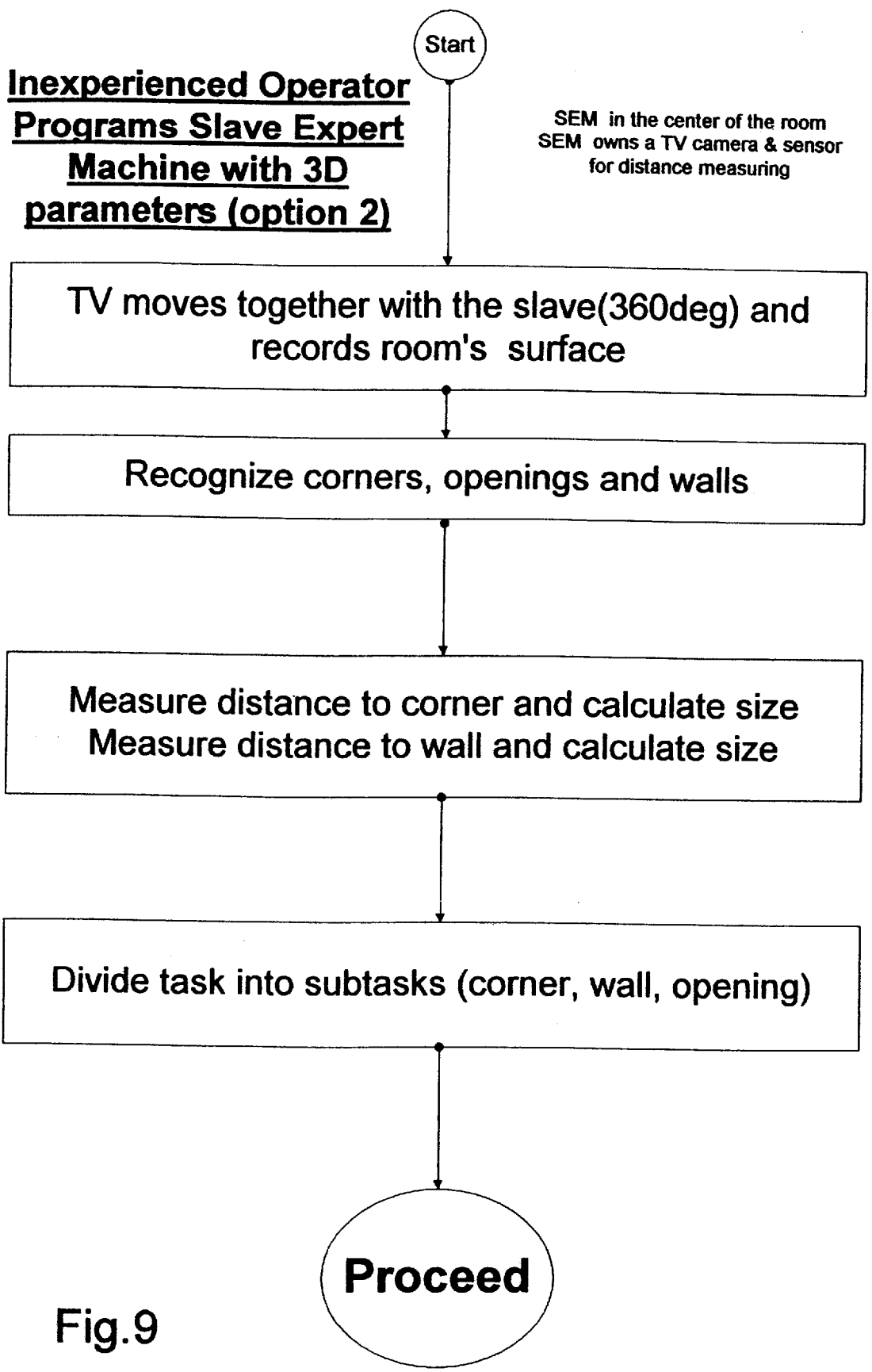

For an arbitrary room which is to be plastered the inexperienced operator places the slave expert machine in the center of the room and programs the required 3D—points in space, as shown in FIGS. 8, 9, where different measurement means (like TV camera) cause different involvement of the operator. The slave expert machine is set in motion.

Below there is presented a list of subtasks and elementary moves that the skilled worker teaches the MEM:

1. Straight wall
2. Corner
3. Rounded wall
4. Door opening
5. Window opening
6. Hold scrapper type 1 with/without mixture
7. Hold scrapper type 2 with/without mixture
8. Hold scrapper type 3 with/without mixture
9. Hold scrapper type 4 with/without mixture
10. Plaster up to down direction—short move
11. Plaster down to up direction—short move
12. Plaster left to right direction—short move
13. Plaster right to left direction—short move
14. Plaster up to down direction—long move
15. Plaster down to up direction—long move
16. Plaster left to right direction—long move
17. Plaster right to left direction—long move
18. Plaster ceiling left to right—short move
19. Plaster ceiling right to left—short move
20. Plaster ceiling hor. to ver.—short move
21. Plaster ceiling ver. to hor.—short move
22. Plaster ceiling left to right—long move
23. Plaster ceiling right to left—long move
24. Plaster ceiling hor. to ver.—long move
25. Plaster ceiling ver. to hor.—long move

What is claimed is:

1. A method of applying knowledge from a human operator to a mobile slave expert machine via a master expert machine, the knowledge serving for computing an optimal control law being required for performing professionally preferably repetitive tasks consisting of a sequence of elementary moves to be performed by the slave expert machine instead of a human operator, the method comprising the following main sequence of steps:

(a) teaching of the master expert machine to perform the required professional task so as to create within the master expert machine a sharable data base for computing a control law for the task, (b) computing said control law for performing the task and dividing the task into subtasks, associated with elementary moves, (c) adapting of said sharable data base to said computed control law and to the slave expert machine, (d) transferring said adapted sharable data base and said control law from the master expert machine to the slave expert machine, whereby the slave expert machine can perform the task autonomously and independent of any form of connection to the master expert machine subsequent to said transfer, and, providing the slave expert machine with a programmed data associated with a particular task to be performed.

2. The method as defined in claim 1, in which said teaching is performed by tracking activity of the master expert machine, said tracking activity is carried out by the human operator so as to move the master expert machine spatially along a predefined trajectory corresponding to the task and said tracking activity is accompanied by generating of plurality of signals in response to movements of the master expert machine, said signals are converted into digital form and stored in said sharable data base.

3. The method as defined in claim 2 in which said plurality of signals defining movement of the master expert machine refers to at least one parameter chosen from the group comprising displacement, force, speed and acceleration.

4. The method defined in claim 3 in which tracking of the master expert machine is carried out along elementary trajectories corresponding to division of the task onto said sequence of elementary moves.

5. The method as defined in claim 2 in which said plurality of signals defining movement of the master expert machine refers to all four of the parameters: displacement, force, speed and acceleration.

6. The method as defined in claim 1 in which said sharable adapted data base and said computed control law are transferred from the master expert machine to the slave expert machine via a communication link chosen from the group comprising a remote control line or a wire communication link.

7. The method as defined in claim 1 in which said programmed data comprises spatial 3D representation of the task to be performed.

8. The method as defined in claim 1 in which the slave expert machine performs a task via superposition and concarenation of a plurality of subtasks and elementary moves transmitted by the master expert machine.

\* \* \* \* \*

UNITED STATES PATENT AND TRADEMARK OFFICE
CERTIFICATE OF CORRECTION

PATENT NO.    : 6,272,396 B1
DATED         : August 7, 2001
INVENTOR(S)   : Taitler It is certified that error appears in the above-identified patent and that said Letters Patent is hereby corrected as shown below:

<u>Title page, Item [54] and Column 1, lines 1-5,</u>
Should read -- MASTER/SLAVE EXPERT MACHINE CONTROL FOR REPETITIVE ACTIVITY --

<u>Column 6,</u>
Line 30, insert -- (e) -- at the beginning of the sub-paragraph.
Line 64, the word -- concatenation -- was mistakenly typed as "concarenation".

Signed and Sealed this

Fourth Day of February, 2003

JAMES E. ROGAN
*Director of the United States Patent and Trademark Office*